United States Patent [19]

St. Martin et al.

[11] Patent Number: 5,013,565
[45] Date of Patent: May 7, 1991

[54] WATER-SOLUBLE RED PIGMENTS FROM MONASCORUBRIN AND RUBROPUNCTATIN AS FOOD COLORANTS

[75] Inventors: Edward J. St. Martin, Libertyville; Paul R. Kurek, Barrington; Elaine F. Schumacher, Arlington Heights, all of Ill.

[73] Assignee: UOP, Des Plaines, Ill.

[21] Appl. No.: 562,879

[22] Filed: Aug. 3, 1990

[51] Int. Cl.$^5$ .............................................. A23L 1/275
[52] U.S. Cl. .................................... 426/250; 426/540; 435/911
[58] Field of Search ................................ 426/250, 540

[56] References Cited

U.S. PATENT DOCUMENTS 3,765,906 10/1973 Yamaguchi et al. ................... 99/148
3,993,789 11/1976 Moll et al. ............................ 426/250

OTHER PUBLICATIONS

Food Technology, p. 49, (Jul., 1986).
B. C. Fielding et al., *Tetrahedron Letters*, No. 5, 24–7 (1960).
Y. Inouye et al., *Tetrahedron*, 18, 1195 (1962).
Kumasaki et al., *Tetrahedron*, 18, 1171 (1962).
Wong and Koehler, *J. Food Science*, 48, 1200 (1983).

*Primary Examiner*—Jeanette Hunter
*Attorney, Agent, or Firm*—Thomas K. McBride; Eugene I. Snyder

[57] ABSTRACT

The orange, water-insoluble pigments monascorubrin and rubropunctatin elaborated by Monascus species can be converted to high purity red, water-soluble pigments by reaction with stoichiometric quantities of organic materials bearing a primary amine functionality. These pigments are suitable as colorants for a broad variety of edible formulations, especially those intended for human consumption, and often serve as suitable replacements for FD&C Red No. 2 and Red No. 4.

44 Claims, No Drawings

WATER-SOLUBLE RED PIGMENTS FROM MONASCORUBRIN AND RUBROPUNCTATIN AS FOOD COLORANTS

BACKGROUND OF THE INVENTION

Consumers first judge the quality of the food product by its color, at least according to Food Technology, page 49 (July, 1986). The food industry has catered to consumer aesthetics, if not actually fostering such an attitude, by giving careful attention to the color of their products, including conducting ongoing investigations into materials which may be used as suitable food colorants.

Although naturally occurring pigments perforce were the first used food colorants, the development of chemistry as a discipline led to many synthetic dyes, especially anilines, to supplant naturally occurring pigments as food additives. As a class synthetic colorants have many advantages, such as a uniform and reproducible color, color stability, absence of flavor, and an oxidative and/or thermal and/or photostability superior to naturally occurring pigments, broad availability relatively insensitive to changes in crop yields and so forth. The resulting popularity of synthetic colorants at least is understandable.

However, with heightened awareness of a consuming public to food additives and increased testing of some representative examples came a concern about their safety. Recent years have seen some materials formerly used as food colorants run the gamut from being beyond reproach to being suspect and even banned or at least used restrictedly. For example, FD&C Red No. 2 and FD&C Violet No. 1 have been banned in the United States and many other countries. Because of a variety of allergic reactions in sensitive individuals induced by FD&C Yellow No. 5 a recent ruling by the FDA requires food colored with it be declared as such on product labels. As a consequence the pendulum has begun to swing once more toward naturally occurring pigments as food additives.

The major pigments produced by Monascus species traditionally grown on rice in the Orient are orange and relatively insoluble in water, but readily react with compounds containing amino groups to form water-soluble colorants. Monascus pigments have been used in the Orient for hundreds of years as a general food colorant and as a colorant for wine and bean curd. They can be made water soluble or oil soluble and are stable at a pH range 2–10. They are heat stable and can be autoclaved. In oriental countries microorganisms of this type typically are grown on grains of rice and once the grains have been penetrated by the red mycelium the whole mass is finely ground with the resulting powder used as a food colorant.

Monascus species have been reported to elaborate several pigments, but most species seem to produce an orange pigment as the major colorant. This water-insoluble pigment is a mixture of monascorubrin and rubropunctatin, I, whose structures were elucidated by B. C. Fielding et al., *Tetrahedron Letters*, No. 5, 24-7 (1960) and Kumasaki et al., *Tetrahedron*, 18, 1171 (1962), and which differ in the former having a 7-carbon chain attached to the ketonic carbonyl group and the latter having a 5-carbon chain. The ratio of monascorubrin and rubropunctatin produced depends on fermentation conditions and the particular species or strain of Monascus used, but generally this ratio is on the order of 3:2.

At least some species, notably *M. purpureus*, produce a yellow pigment, monascoflavin, the reaction product of rubropunctatin with two moles of hydrogen and which arises from reduction of two conjugated olefinic bonds in the chromophore of the parent. Y. Inouye et al., *Tetrahedron*, 18, 1195 (1962). [Parenthetically, it may be noted that these authors state that monascoflavin is the reduction product of monascorubrin. However, monascorubrin and rubropunctatin are homologs differing in having $C_7H_{15}$ and $C_5H_{11}$ ketonic side chains, respectively, and monascoflavin is specified as having a $C_5H_{11}$ side chain. Therefore its precursor must be rubropunctatin. It must be realized that for many years there was rampant confusion between monascorubrin and rubropunctatin, with a concomitant lack of distinction, whose effects are not yet entirely dispelled.]

Although the monascorubrin-rubropunctatin mixture which constitutes the orange pigment produced as the direct fermentation product of Monascus species is water insoluble and therefore is of limited utility as a food colorant, it has been recognized for some time that these materials react with primary amines to afford red colorants, many of which are water soluble. Yamaguchi, U.S. Pat. No. 3,765,906, reported that the orange insoluble pigment, either in the fermentation medium or as an isolate, reacted with water-soluble proteins, peptides, or amino acids to afford red water-soluble pigment. The reaction of the orange water-insoluble pigment with amino sugars, polymers of amino sugars, polyamino acids, and amino alcohols is reported in U.S. Pat. No. 3,993,789. The production of red water-soluble pigment by reacting the insoluble orange pigment with aminoacetic acid (glycine) and aminobenzoic acid has been reported by Wong and Koehler, *J. Food Science*, 48, 1200 (1983), who also investigated their color characteristics and stability. All of the aforementioned water-soluble red pigments are believed to have the structure II,

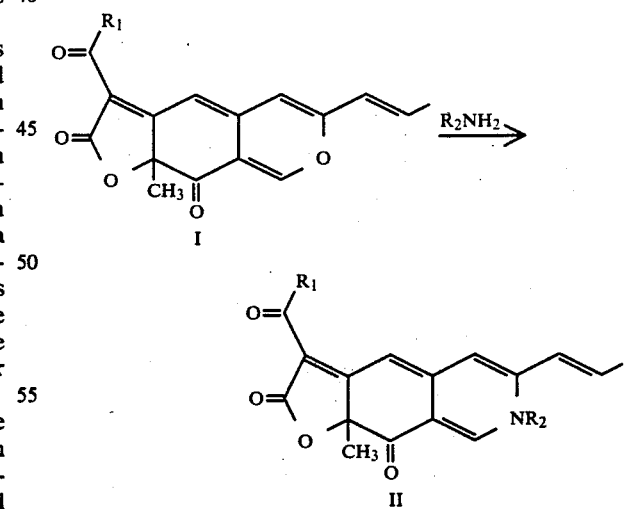

where II is a monascorubrin-rubropunctatin mixture and $R_1$ is $C_5H_{11}$ or $C_7H_{15}$. Despite the interest as manifested by the numerous citations, none of the red water-soluble pigments appear to have gained broad, substantial use as a food colorant.

Mixtures of red, water-soluble pigments resulting from the reaction of protein hydrolysates with I have seen limited use in some countries. However convenient and inexpensive such mixtures may be, their variability presents some problems with color reproduction, and the indefinite nature of their composition complicates the safety, toxicity, and pharmacological/physiological testing necessary for their clearance as food colorants in edible formulations intended for human consumption. The importance of exact knowledge of the structure was recognized by Moll et al., the patentees of U.S. Pat. No. 3,993,789, whose purpose was, in part, to provide red colorants of well-defined structure.

Red colorants of suitable purity for use in foods intended for human consumption, here defined as being at least 95% pure, rarely, if ever, have been produced in the prior art. Thus, Moll et al. use the "pure crystalline form" of what is referred to as monascorubrin to react with various amines to give red, water-soluble pigments whose purity is nondescript. Analogously, Wong and Koehler, op. cit., react purified, recrystallized precursor pigment (whose purity was not determined) with glycine, p-aminobenzoic acid, and L-glutamic acid to give colorants which were not isolated. Kumasaki et al., op. cit., reacted N-methylamine with precursor pigment and purified the product by chromatography to afford a red pigment whose elemental analysis was outside the bounds of the ±0.3% variance from theory normally associated with high purity.

In contradistinction to the prior art we have been able to routinely prepare red pigments of appropriate purity. Our success hinges in part on the availability of the water-insoluble orange pigment from Monascus in high purity. The remainder of our success derives from our observation that the monascorubrin-rubropunctatin mixture reacts with approximately stoichiometric quantities of amines having a primary amino group in essentially a quantitative manner and with virtually 100% selectivity. The result is production of red pigments of at least 95 percent purity and with a well-defined structure. In addition, many of these water-soluble red pigments possess no objectionable taste when used in an amount effective to impart a red color in foods designed for human consumption.

SUMMARY OF THE INVENTION

The purpose of this invention is to provide a high purity, water-soluble red pigment, especially one effective as a red food colorant, and more particularly one which has no objectionable taste when used as a red colorant in edible formulations intended for human consumption in an amount effective to impart a red color. An embodiment is a red pigment at least 95 weight percent of which consists of homologs of formula II. In a more specific embodiment $R_2$ is a moiety such that $R_2NH_2$ is an alkyl ester of a naturally occurring amino acid. In a still more specific embodiment the alkyl ester is of a naturally occurring amino acid where the alkyl portion contains from 1 to 4 carbon atoms. In another embodiment $R_2NH_2$ is a dipeptide, each of whose amino acid constituents is a naturally occurring amino acid or an alkyl ester of said dipeptide. Another aspect of our invention is a method of imparting red color to edible formulations intended for human consumption comprising adding to the formulations a water-soluble red pigment at least 95 weight percent of which consists of homologs with the structure II. Other aspects and embodiments of our invention will become apparent from the following description.

DESCRIPTION OF THE INVENTION

This invention is based on our ability to produce a red pigment from monascorubrin-rubropunctatin mixtures at least 95 weight percent of which has structural formula II. The success of our invention is based in part upon our capability of producing high purity monascorubrin-rubropunctatin mixtures, that is, mixtures of orange precursor pigment at least 95, and generally greater than 97, weight percent of which corresponds to materials with structure I. In remaining part the success of our invention is based upon the observation that monascorubrin-rubropunctatin mixtures react with approximately stoichiometric amounts of primary amino groups essentially quantitatively and with virtually 100% selectivity to form products of structure II. Coupled with our identification of numerous water-soluble red pigments II which, when used in an amount effective to color foods, show no objectionable taste, our invention makes available for the first time red food colorants from Monascus capable of replacing FD&C Red No. 2 as well as FD&C Red No. 40.

The water-soluble red pigments of structure II when used as food colorants will be used at levels between about 50 parts per million and about 0.6 weight percent, depending upon the food to be colored, the intensity of color sought, and whether the pigments of this invention are the sole source of the red color. Since it is common practice to use several colorants in order to give an edible formulation the particular hue and intensity desired, the pigments of this invention often will be used in combination with other food colorants, whatever may be their color.

One class of amines which can be used in the red food colorants of our invention are the naturally occurring amino acids. All have the L configuration (except glycine, which lacks an asymmetric carbon) and include alanine, arginine, asparagine, aspartic acid, cysteine, cystine, 3,5-dibromotyrosine, 3,5-diiodotyrosine, glutamic acid, glutamine, glycine, histidine, hydroxylysine, hydroxyproline, isoleucine, leucine, lysine, methionine, phenylalanine, proline, serine, threonine, thyroxine, tryptophane, tyrosine, and valine.

Since many of the pigments II from amino acids have a distinct taste which under some circumstances may be judged objectionable, even at the low levels required for food coloration, amino acid derivatives whose carboxylic acid group is "neutralized" are preferred, and esterification of the free carboxylic acid group(s) is favored. Esters of saturated, aliphatic alcohols are suitable, and those esters whose alkyl group contains up to 10 carbon atoms, but more particularly alkyl esters where the alkyl group contains from 1 to 4 carbon atoms, are preferred. The methyl, ethyl, and propyl esters of the foregoing natural amino acids are especially desirable in the practice of this invention. It has been found that food colorants having an $R_2$ group where $R_2NH_2$ comports with these requirements show excellent water-solubility and good red color characteristics, have little or no undesirable taste characteristics, and consequently are preferred embodiments in the practice of our invention.

Another desirable class of food colorants corresponding to II arises when $R_2NH_2$, the amine parent of $R_2N$, is a dipeptide, especially a dipeptide each of whose constituents is one of the naturally occurring amino acids enumerated above. There is no need to list the various dipeptides which can be used in the practice of our invention, since any permutation of naturally occurring amino acids in the dipeptide is acceptable. The carboxyl group in the dipeptide still leads to undesirable taste characteristics, and accordingly neutral derivatives of dipeptides, especially esters of saturated aliphatic alcohols whose alkyl group contains no more than 10 carbon atoms, and preferably 1 to 4 carbon atoms, are recommended. The methyl ester of the dipeptide resulting from condensation of aspartic acid with phenylalanine, or aspphe [N-L-α-aspartyl-L-phenylalanine 1-methyl ester; 3-amino-N-(α-carboxyphenethyl) succinamic acid N-methyl ester; commonly known as aspartame], is a particularly preferred dipeptide in the practice of our invention.

A further class of red colorants which is highly recommended is that whose members have, as the parent of the $R_2N$ fragment, $R_2NH_2$ corresponding to amino alcohols. Simple amino alcohols containing up to about 10 carbon atoms may be used although those with 2 to 4 carbon atoms are preferred and include the linear, terminally substituted amino alcohol such as 2-aminoethanol, 3-aminopropanol, 4-aminobutanol, 5-aminopentanol, 6-aminohexanol, 7-aminoheptanol, 8-aminooctanol, 9-aminononanol, 10-aminodecanol. Branched amino alcohols also may be used and are exemplified by such members as 2-hydroxypropylamine, 2-aminopropanol-1, 3-aminobutanol-1, 3-aminobutanol-2, 2-aminobutanol-1, 1-aminobutanol-2, 1-aminobutanol-3, and so forth.

Among the amino alcohols the polyhydric amino alcohols are favored. By "polyhydric amino alcohols" are meant amino alcohols which contain more than one hydroxyl group per molecule. These are exemplified by sugar amines, especially amines of tetroses, pentoses and hexoses with the general formula $H_2NCH_2(CHOH)_n$-CHO, where n=2, 3 or 4, or formula $HOCH_2(CHOH)_x(CHNH_2)(CHOH)_yCHO$, where $x+y+1$ is 2, 3 or 4, as illustrated by aminosorbose, glucosamine, mannosamine, and galactosamine. Amines of sugar alcohols, especially those where one of the terminal hydroxy methyl groups has been converted to an aminomethyl group, is another class of favored polyhydric alcohols, of general formula $HOCH_2(CHOH)_nCH_2NH_2$, where n is 2, 3 or 4, or $HOCH_2(CHOH)_x(CHNH_2)(CHOH)_yCH_2OH$, where $x+y+1$ is 2, 3, or 4, and is exemplified by such materials as 1-amino-1-deoxy-D-glucitol (1-amino-1-deoxysorbitol; glucamine), erythramine, mannamine, galactamine, ribosamine, arabinosamine, lyxosylamine, 2-aminomannitol, 2-aminoglucitol, and 2-aminoribitol.

An additional group of colorants which may be successfully used in the practice of our invention is that containing $R_2$ where $R_2NH_2$ are aliphatic and cycloaliphatic amines containing from 2 to 10 carbon atoms, especially those containing from two to six carbon atoms. Such amines include ethylamine, propylamine, butylamine, pentylamine, and hexylamine, cyclopentylamine, cyclohexylamine, methylcyclobutylamine, and so on. The major restriction on such hydrocarbon groupings is that they not be such a long chain as to substantially reduce water-solubility, since the food colorants of our invention are required to have sufficiently high water-solubility to permit their use as food colorants. Polymeric amines also may be used in the practice of our invention so long as they do not interfere with the requisite solubility. Examples of such amines include poly(vinylamine), poly(allylamine), poly(ethyleneamine), and so on.

The red food colorants of this invention have several attributes important to their successful use in edible formulations. All show absorption in the ultraviolet-visible portion of the spectrum which is concentration and solvent dependent. However, at a concentration of about $10^{-3}$ molar and in a solvent containing 50–80% methanol and 50–20% aqueous hydrochloric acid at pH 3 ($10^{-3}$ molar) all will have an absorption maximum occurring in the region of 465–515 nanometers (nm), and more preferably have a maximum in the region of 480–505 nm with an extinction coefficient of at least $4 \times 10^4$ (L cm mol$^{-1}$), preferably at least $8 \times 10^4$, and most preferably at least about $10^5$. The food colorants also must be sufficiently soluble in water when used to color, for example, still drinks so as to impart the necessary intensity of the red color sought. This minimum solubility will, of course, depend upon the extinction coefficient of the particular food colorant as well as the desired color intensity. Perhaps most important of all is the requirement that when used in a quantity effective to impart the desired red color, the food colorant must not impart any objectionable taste to the edible formulation being colored. Even though the food colorant may be used at a relatively low level, some members may impart a noticeable and objectionable taste to the formulation being colored. This will depend not only on the particular food colorant used, but also on the particular edible formulation.

The red food colorants may be used alone at concentrations as low as about 50 parts per million and as high as 0.6 weight percent. When used in conjunction with other colorants, the red food colorants of our invention may be used in correspondingly lower levels, depending upon the concentration of the second colorant, the color and hue desired, and so forth. Our food colorants may be used in a variety of edible formulations where a red color is desirable. An illustrative list of foods, which is only representative but is not exhaustive of those for which our colorant is usable, includes candy, yogurt, ice cream, other frozen desserts, gelatin, carbonated and still drinks, powdered cheese mixes, formed seafood products, and meats.

The following examples are intended to be only illustrative of our invention and do not limit it in any way.

PREPARATION OF RED PIGMENTS

The following procedure was used, with minor variations, for the preparation of the red pigments II. To a 100 mL three-neck round bottom flask containing a stirring bar and equipped with a gas inlet (for a nitrogen blanket), pH electrode, and thermometer was charged 0.2 g of the orange precursor pigment. For best results it is desirable that as high a purity precursor pigment is used as is possible, most desirably a precursor pigment of at least 96% purity. To this was added 30 g of methanol and the mixture was stirred until homogeneous with constant pH readings. To the stirred solution was added a stoichiometric amount of the amine, either as the free base or as a salt. If the pH after addition was acidic, base was added usually as 0.01 normal sodium hydroxide, until the pH was approximately 7 and constant. Reaction between the amine and the precursor pigment was performed at ambient temperature generally for no longer than 2 hours, although in most cases reaction was complete within minutes. Methanol was then evaporated at reduced pressure, the product was redissolved in ethanol and the ethanolic solution was filtered to remove inorganic salts, after which ethanol was evaporated at 30° C. at reduced pressure to afford the red pigments, usually as a crystalline solid.

For best results it is recommended that as high purity a precursor pigment be used as is possible. Because we have found the reaction between primary amines and precursor pigment is essentially quantitative, only a stoichiometric amount of amine (or amine salts) is used in the reaction. The reaction generally occurs rapidly at a pH of about 7 or above and at ambient temperatures. The reaction generally was complete in minutes, although this will depend upon the amine used, temperature, dilution of the precursor pigment, and the scale of the reaction.

ANALYTICAL PROCEDURES

Analyses were performed by a combination of HPLC and spectroscopic (ultraviolet and visible) methods. Chromatographic analyses were performed using a Hewlett Packard 1090 HPLC with a diode array detector sensitive over the range of 200-600 nanometers utilizing a Hypersil C18 column 2.1×200 mm operating at ambient temperature and a flow rate of 0.5 mL/min. Aqueous hydrochloric acid at pH 3.0 and methanol were the two independent solvent systems used in gradient elution. A four-microliter portion of a methanolic pigment solution at a concentration of 3.0 mg/mL was injected on the column. Depending upon the hydrophobicity of the colorant the solvent gradient used was 65-85% methanol, 50-70% methanol, or 35-55% methanol. All gradients were run at 1% per minute.

Eluants were monitored at 210 nm and at either 474 nm for the precursor pigment or 510 nm for the red pigments II. Based on the reasonable assumption that all organic material will absorb at 210 nm, the absorbance at this wave length is a measure of total organic material. The area of each chromatographic peak detected at 210 nm is then a measure of the abundance of that peak relative to all organic material present. Hence, purity at 210 nm refers to purity of a peak relative to all organic material.

On the other hand, absorbance at 474 or 510 nm, whichever the case may be, is a measure of only the colored material present. Consequently, the area percent of any chromatographic peak as detected at 474 or 510 nm is a measure of its spectral purity; that is, the relative contribution of that peak to all peaks responsible for the color which is measured by the absorption at 474 or 510 nm.

The homogeneity of any one peak can be determined by obtaining its complete ultraviolet and visible spectrum at different times during its elution, e.g., at a time immediately prior to the peak maximum, a time corresponding to the peak maximum, and a time somewhat after the peak maximum. If in fact the peak represents but one component, then the three spectra, taken at somewhat different times during peak elution, would be completely superimposable. Therefore, the deviation from superimposability of the ultraviolet spectra is a measure of homogeneity, or purity of any one peak. This method was used to assess the homogeneity of the precursor pigments I and the red pigments II.

In all cases there were two main peaks eluted on HPLC corresponding to the case where $R_1=C_5H_{11}$ (rubropunctatin or its red pigment derivative) as the earlier eluting peak and one corresponding to the case where $R_1=C_7H_{15}$ (monascorubrin or its red pigment analog) as the later eluting material.

PRECURSOR PIGMENT ANALYTICAL STANDARDS

Twice recrystallized precursor pigment was further purified by preparative HPLC on the aforementioned column using as eluant 75% methanol - 25% aqueous hydrochloric acid at pH 3.0. The pigments were resolved into two fractions which were collected and crystalline material was obtained by vacuum evaporation of methanol from the eluant. Crystals were harvested by filtration, washed with water, and dried under vacuum. Upon analysis by HPLC, peak I ($R_1=C_5H_{11}$) was found to contain 1.4% of the $C_7$ homolog. Peak II ($R_1=C_7H_{15}$) was pure and contained no other measurable components. These purified pigments were then used to construct a multiple point standard curve for subsequent analysis of precursor pigment.

GLYCINE RED PIGMENT II ANALYTICAL STANDARDS

Equal molar amounts of essentially pure precursor pigment, dissolved at 3% by weight in methanol at 60° C., and 40% by weight glycine in water were mixed and adjusted to pH 7.0 at room temperature with sodium hydroxide. When reaction was complete methanol and water were removed by evaporation under vacuum at 45° C. The resulting red glycine pigment derivatives were purified by preparative HPLC which resolved them into an earlier eluting $R_1=C_5H_{11}$ peak and a later eluting $R_1=C_7H_{15}$ peak. Elution with 62% methanol and 38% aqueous hydrochloric acid at pH 3.0 afforded two fractions whose elution times corresponded to the two aforementioned isolated peaks. Each fraction was neutralized with sodium hydroxide pH 7 prior to removal of methanol and water under vacuum at 45° C. The dried material obtained thereby was redissolved in a minimal amount of pure isopropyl alcohol which was filtered to remove undissolved salts. The isopropyl alcohol then was removed by evaporation under vacuum.

The earlier eluted peak was found by analytical HPLC to contain 1.4% of an unidentified contaminant absorbing at 510 nm having a shorter retention time. The later eluting peak also contained 1.4% of a second component which appeared to be the $C_5H_{11}$ homolog. These purified pigments were used to construct a multiple point standard curve for HPLC analysis of glycine red pigment.

REACTION OF PURE PRECURSOR PIGMENT WITH PURE GLYCINE

Analytically pure precursor pigment, containing no measurable impurity as determined using the foregoing analytical techniques and the precursor pigment standards described above was reacted with analytical grade glycine, and the red pigment isolated as described previously. The reaction product was analyzed in triplicate using the HPLC standard curves for the red glycine pigment and found to have a purity of 102%, i.e., no measurable impurities were present. The results of this experiment show not only the quantitative nature of the reaction but also the 100% selectivity attending conversion of the precursor pigment.

PURITY OF OTHER RED PIGMENTS BY SIMPLE HPLC ANALYSIS.

We have shown above by rigorous analytical HPLC using purified glycine red derivatives for both $C_5$ and $C_7$ forms that a typical glycine red pigment production run affords only the two expected pigments. Although pure standards for every amine derivative synthesized were not available, these derivatives can be analyzed for purity by simple HPLC analysis by determining the area percent of red pigment peaks that can be separated and measured by absorbance at 510 nm wavelength light. These results indicate that the reaction of purified precursor pigments with different amines produces the expected two compounds with a spectral purity usually greater than 95% as determined by area percent calculations. One exception is lysine which has both an alpha and epsilon amino group that can result in four derivatives being formed. The reaction with the ethyl ester of glycine also produced four derivatives because of a transesterification with the methanol used as the reaction solvent. The presence of both the methyl and ethyl derivatives was confirmed independently by NMR analysis. The use of pure crystalline precursor pigments of rubropunctatin and monascorubrin provides a reliable method of producing pure red pigment derivatives with no measurable contamination with other pigments, side products or decomposition products.

TABLE 1

| Spectral Purity of Red Pigments II | |
|---|---|
| $R_2NH_2$ | Spectral Purity[a] |
| glycine | 100 |
| ethanolamine | 93 |
| glycine ethyl ester[b] | 99 |
| lysine[c] | 96 |
| glutamic acid | 100 |
| glucamine | 96 |

[a]Area percent of pigment peaks to total material eluted by HPLC as measured by detector at 510 nm.
[b]Contains both methyl and ethyl esters; see text.
[c]Contains both alpha and epsilon amine derivatives.

TABLE 2

| Spectral Characteristics of Representative Pigments II[a] | | |
|---|---|---|
| Amine[b] | max.[c] | $\epsilon$[d] |
| Glucamine | 518 | 52836 |
| Glucosamine | 510 | 38687 |
| Taurine | 510 | 63884 |
| Aspartame | 506 | 49182 |
| Glycine Ethyl Ester | 510 | 41664 |
| Glycine | 510 | 65306 |
| Leucine | 510 | 42215 |
| Isobutylamine | 510 | 99699 |
| Ethanolamine | 516 | 96863 |

[a]Pigments consisted of approximately 60/40 mixtures of $C_7H_{15}/C_5H_{11}$ homologs.
[b]$R_2NH_2$.
[c]Wavelength of maximum absorbance (in nm) using 50-80% methanol - $10^{-3}$ molar aqueous HCl.
[d]Extinction coefficient in L cm mol$^{-1}$.

THRESHOLD OBJECTIONABLE FLAVOR OF RED PIGMENTS II IN STILL DRINKS

Still drinks at pH 3.4 were prepared containing II at levels corresponding to 1.3, 4, 12, 36, 108, and 324 ppm. The preparations were sampled by an expert panel to determine the onset of objectionable taste of selected red colorants, with the results summarized in Table 3. The higher the threshold, the less objectionable is the taste of the pigments.

TABLE 3

| Threshold Level of Unacceptable Flavor in Parts per Million | |
|---|---|
| $R_2NH_2$ | Threshold |
| D-glucamine | 108 |
| glycine | 36 |
| L-glutamic acid | 108 |

TABLE 3-continued

| Threshold Level of Unacceptable Flavor in Parts per Million | |
|---|---|
| $R_2NH_2$ | Threshold |
| L-lysine | 324 |
| monoethanolamine | 36 |

These results show significant differences in objectionable taste thresholds among the various amines, with glycine and monoethanolamine manifesting the most intense objectionable taste.

What is claimed is:

1. A water-soluble red pigment at least 95 weight percent of which consists of homologs having the structure,

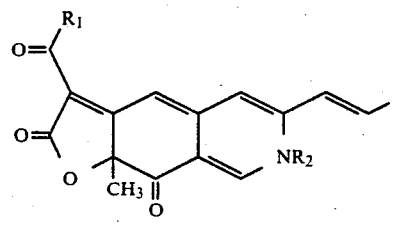

where $R_1$ is $C_5H_{11}$ or $C_7H_{15}$ and $R_2$ is a moiety such that $R_2NH_2$ is selected from the group consisting of naturally occurring amino acids, alkyl esters of amino acids whose alkyl group contains up to 10 carbon atoms, amino alcohols, dipeptides, alkyl esters of dipeptides whose alkyl group contains up to 10 carbon atoms, aliphatic and cycloaliphatic amines containing from 2 to 10 carbon atoms, and polymeric amines.

2. The method of claim 1 where $R_2NH_2$ is an amino alcohol.

3. The method of claim 2 where the amino alcohol is a polyhydric amino alcohol.

4. The method of claim 1 where $R_2NH_2$ is a naturally occurring amino acid.

5. The method of claim 1 where $R_2NH_2$ is an alkyl ester of a naturally occurring amino acid whose alkyl portion contains from 1 to 4 carbon atoms.

6. The method of claim 1 where $R_2NH_2$ is a dipeptide, each of whose amino acid constituents is a naturally occurring amino acid.

7. The method of claim 1 where $R_2NH_2$ is an alkyl ester of a dipeptide, each of whose amino acid constituents is a naturally occurring amino acid, and whose alkyl portion of the ester group contains up to 10 carbon atoms.

8. The method of claim 7 where the dipeptide ester is aspartame.

9. The method of claim 1 where $R_2NH_2$ is an amine of a sugar alcohol with the formula $HOCH_2(CHOH)_nCH_2NH_2$, where n is 2, 3, or 4, or the formula $HOCH_2(CHOH)_x(CHNH_2)(CHOH)_yCH_2OH$, where $x+y+1$ is 2, 3, or 4.

10. The method of claim 9 where n=4 or $x+y+1=4$.

11. The method of claim 10 where $R_2NH_2$ is glucamine.

12. A water-soluble red food colorant at least 95 weight percent of which consists of homologs having the structure,

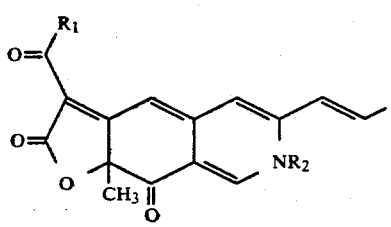

where $R_1$ is $C_5H_{11}$ or $C_7H_{15}$ and $R_2$ is a moiety such that $R_2NH_2$ is selected from the group consisting of naturally occurring amino acids, alkyl esters of amino acids whose alkyl group contains up to 10 carbon atoms, amino alcohols, dipeptides, alkyl esters of dipeptides whose alkyl group contains up to 10 carbon atoms, aliphatic and cycloaliphatic amines containing from 2 to 10 carbon atoms, and polymeric amines, said food colorant imparting no perceptible objectionable taste when added to edible formulations intended for human consumption at a concentration effective to impart a red color.

13. The method of claim 12 where $R_2NH_2$ is an amino alcohol.

14. The method of claim 13 where the amino alcohol is a polyhydric amino alcohol.

15. The method of claim 12 where $R_2NH_2$ is a naturally occurring amino acid.

16. The method of claim 12 where $R_2NH_2$ is an ester of a naturally occurring amino acid whose alkyl portion contains from 1 to 4 carbon atoms.

17. The method of claim 12 where $R_2NH_2$ is a dipeptide, each of whose amino acid constituents is a naturally occurring amino acid.

18. The method of claim 12 where $R_2NH_2$ is an alkyl ester of a dipeptide, each of whose amino acid constituents is a naturally occurring amino acid and whose alkyl portion of the ester group contains from 1 to 4 carbon atoms.

19. The method of claim 18 where the dipeptide ester is aspartame.

20. The method of claim 12 where $R_2NH_2$ is an amine of a sugar alcohol with the formula $HOCH_2(CHOH)_nCH_2NH_2$, where n is 2, 3, or 4, or the formula $HOCH_2(CHOH)_x(CHNH_2)(CHOH)_yCH_2OH$, where $x+y+1$ is 2, 3, or 4.

21. The method of claim 20 where $n=4$ or $x+y+1=4$.

22. The method of claim 21 where $R_2NH_2$ is glucamine.

23. A method of imparting red color to edible formulations intended for human consumption comprising adding to said edible formulations an amount effective to impart said red color of a water-soluble red pigment at least 95 weight percent of which consists of homologs having the structure.

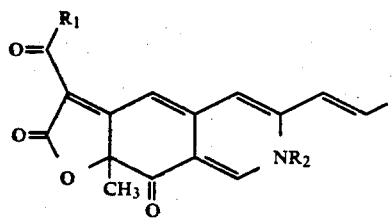

where $R_1$ is $C_5H_{11}$ or $C_7H_{15}$, or a mixture thereof, and $R_2$ is a moiety such that $R_2NH_2$ is selected from the group consisting of naturally occurring amino acids, alkyl esters of amino acids whose alkyl group contains up to 10 carbon atoms, amino alcohols, dipeptides, alkyl esters of dipeptides whose alkyl group contains up to 10 carbon atoms, aliphatic and cycloaliphatic amines containing from 2 to 10 carbon atoms, and polymeric amines.

24. The method of claim 23 where $R_2NH_2$ is an amino alcohol.

25. The method of claim 24 where the amino alcohol is a polyhydric amino alcohol.

26. The method of claim 23 where $R_2NH_2$ is a naturally occurring amino acid.

27. The method of claim 23 where $R_2NH_2$ is an alkyl ester of a naturally occurring amino acid whose alkyl portion contains from 1 to 4 carbon atoms.

28. The method of claim 23 where $R_2NH_2$ is a dipeptide, each of whose amino acid constituents is a naturally occurring amino acid.

29. The method of claim 23 where $R_2NH_2$ is an alkyl ester of a dipeptide, each of whose amino acid constituents is a naturally occurring amino acid, and whose alkyl portion of the ester group contains up to 10 carbon atoms.

30. The method of claim 29 where the dipeptide ester is aspartame.

31. The method of claim 23 where $R_2NH_2$ is an amine of a sugar alcohol with the formula $HOCH_2(CHOH)_nCH_2NH_2$, where n is 2, 3, or 4, or the formula $HOCH_2(CHOH)_x(CHNH_2)(CHOH)_yCH_2OH$, where $x+y+1$ is 2, 3, or 4.

32. The method of claim 31 where $n=4$ or $x+y+1=4$.

33. The method of claim 32 where $R_2NH_2$ is glucamine.

34. A method of imparting red color to edible formulations intended for human consumption without imparting any perceptible objectionable taste thereto comprising adding to said edible formulations an amount effective to impart said red color of a water-soluble red pigment at least 95 weight percent of which consists of homologs having the structure,

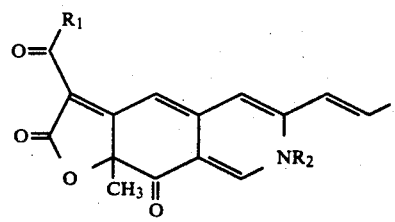

where $R_1$ is $C_5H_{11}$ or $C_7H_{15}$, or a mixture thereof, and $R_2$ is a moiety such that $R_2NH_2$ is selected from the group consisting of naturally occurring amino acids, alkyl esters of amino acids whose alkyl group contains up to 10 carbon atoms, amino alcohols, dipeptides, alkyl esters of dipeptides whose alkyl group contains up to 10 carbon atoms, aliphatic and cycloaliphatic amines containing from 2 to 10 carbon atoms, and polymeric amines.

35. The method of claim 34 where $R_2NH_2$ is an amino alcohol.

36. The method of claim 35 where the amino alcohol is a polyhydric amino alcohol.

37. The method of claim 34 where $R_2NH_2$ is a naturally occurring amino acid.

38. The method of claim 34 where $R_2NH_2$ is an alkyl ester of a naturally occurring amino acid whose alkyl portion contains from 1 to 4 carbon atoms.

39. The method of claim 34 where $R_2NH_2$ is a dipeptide, each of whose amino acid constituents is a naturally occurring amino acid.

40. The method of claim 34 where $R_2NH_2$ is an alkyl ester of a dipeptide, each of whose amino acid constituents is a naturally occurring amino acid, and whose alkyl portion of the ester group contains up to 10 carbon atoms.

41. The method of claim 34 where the dipeptide ester is aspartame.

42. The method of claim 34 where $R_2NH_2$ is an amine of a sugar alcohol with the formula $HOCH_2(CHOH)_nCH_2NH_2$, where n is 2, 3, or 4, or the formula $HOCH_2(CHOH)_x(CHNH_2)(CHOH)_yCH_2OH$, where $x+y+1$ is 2, 3, or 4.

43. The method of claim 42 where $n=4$ or $x+y+1=4$.

44. The method of claim 43 where $R_2NH_2$ is glucamine.

* * * * *